(No Model.)
F. M. THOMPSON.
COTTON STALK CUTTER.
No. 254,408. Patented Feb. 28, 1882.
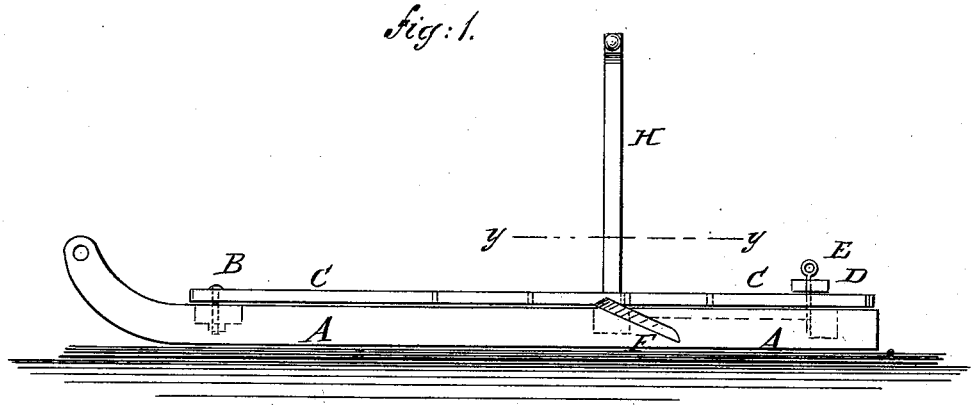
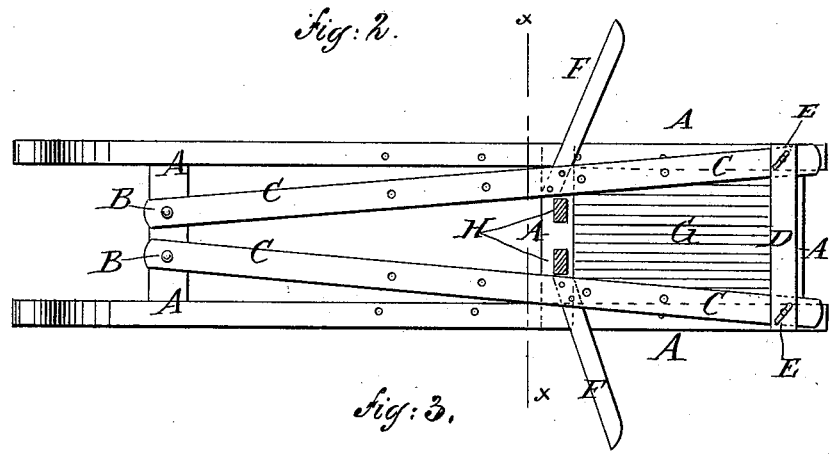
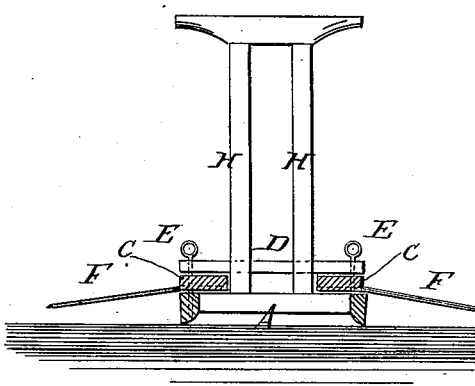
WITNESSES:
Chas. Nigg.
C. Sedgwick
INVENTOR:
F. M. Thompson
BY Munn & Co.
ATTORNEYS.

UNITED STATES PATENT OFFICE.

FRANCIS M. THOMPSON, OF McKINNEY, TEXAS.

COTTON-STALK CUTTER.

SPECIFICATION forming part of Letters Patent No. 254,408, dated February 28, 1882.

Application filed November 12, 1881. (No model.)

*To all whom it may concern:*

Be it known that I, FRANCIS M. THOMPSON, of McKinney, in the county of Collin and State of Texas, have invented certain new and useful Improvements in Cotton-Stalk Cutters, of which the following is a full, clear, and exact description.

Reference is to be had to the accompanying drawings, forming part of this specification, in which similar letters of reference indicate corresponding parts in all the figures.

Figure 1 is a side elevation of my improvement. Fig. 2 is a plan view of the same, partly in section, through the line $y\ y$, Fig. 1. Fig. 3 is a sectional end elevation of the same, taken through the line $x\ x$, Fig. 2.

The object of this invention is to facilitate the operation of cutting down of cotton-stalks in preparing the ground for a new crop.

The invention consists in the combination, with the sled provided with a series of holes in its upper surface, of the hinged perforated bars, the cross-bar, the pins, and the knives; also, in the combination, with the sled carrying the hinged perforated bars, cross-bar, and knives, of the platform secured to the rear part of the sled and the standards secured to a cross-bar of the sled in front of the platform, as hereinafter fully described.

A represents a sled, which is made of such a width as to pass readily between the rows of cotton-stalks. The lower parts of the runners of the sled A are made thin, so that they will bed themselves in the ground to steady the sled and prevent it from having a lateral movement.

To the middle part of the front cross-bar of the sled A, and at a little distance apart, are hinged by bolts B the forward ends of two bars, C. The rear parts of the bars C are connected and held at the desired distance apart by a cross-bar, D, the ends of which are secured to the said bars C by pins E passing through them and through the bars C and into the runners of the sled. Several holes are formed in the bars C and in the sled-runners to receive the pins E, so that the knives F can be adjusted at such a distance apart as the width of the rows may require.

To the bars C, a little in the rear of their centers, are securely attached the inner ends or shanks of two knives or cutters, F, which incline to the rearward, as shown in Figs. 1 and 2. The knives F are inclined downward slightly toward their outer ends, and their inner ends are attached to the lower sides of the bars C, so that the said knives will cut the stalks close to the ground as the machine is drawn forward between two rows.

To the rear part of the sled A is attached a platform, G, for the driver to stand upon while using the machine. To a cross-bar of the sled A are attached one or more standards, H, for the driver to take hold of to give him more security when standing upon the platform G.

The machine is designed to be drawn by a single horse, or by two horses driven tandem, so that they can both walk between the rows.

Having thus fully described my invention, I claim as new and desire to secure by Letters Patent—

1. In a cotton-stalk cutter, the combination, with the sled A, provided with a series of holes in its upper surface, of the hinged perforated bars C, the cross-bar D, the pins E, and the knives F, substantially as and for the purpose set forth.

2. In a cotton-stalk cutter, the combination, with the sled A, carrying the hinged perforated bars C, cross-bar D, and knives F, of the platform G, secured to the rear part of the sled, and the standards H, secured to a cross-bar of the sled in front of the platform, substantially as and for the purpose set forth.

FRANCIS MARION THOMPSON.

Witnesses:
JAMES L. GRAY,
A. J. TAYLOR.